United States Patent
Boudguiga et al.

(10) Patent No.: US 12,010,207 B2
(45) Date of Patent: Jun. 11, 2024

(54) METHOD FOR CONFIDENTIALLY PROCESSING DATA OF A VEHICLE

(71) Applicant: COMMISSARIAT A L'ENERGIE ATOMIQUE ET AUX ENERGIES ALTERNATIVES, Paris (FR)

(72) Inventors: Aymen Boudguiga, Antony (FR); Thanh Hai Nguyen, Paris (FR); Oana Stan, Massy (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 215 days.

(21) Appl. No.: 17/614,438

(22) PCT Filed: May 27, 2020

(86) PCT No.: PCT/FR2020/050893
§ 371 (c)(1),
(2) Date: Nov. 26, 2021

(87) PCT Pub. No.: WO2020/240135
PCT Pub. Date: Dec. 3, 2020

(65) Prior Publication Data
US 2022/0239463 A1    Jul. 28, 2022

(30) Foreign Application Priority Data

May 28, 2019   (FR) ..................... 19 05644

(51) Int. Cl.
*H04L 9/00* (2022.01)
*H04L 9/08* (2006.01)
*H04L 9/14* (2006.01)

(52) U.S. Cl.
CPC ............ *H04L 9/008* (2013.01); *H04L 9/0822* (2013.01); *H04L 9/14* (2013.01)

(58) Field of Classification Search
CPC ......... H04L 9/008; H04L 9/0822; H04L 9/06; H04L 9/14; H04L 2209/76
See application file for complete search history.

(56) References Cited

U.S. PATENT DOCUMENTS

2019/0023279 A1   1/2019 Schacher

OTHER PUBLICATIONS

Lauter et al., Can Homomorphic Encryption be Practical?, ACM, 2011.*
Gupta et al., A Fully Homomorphic Encryption scheme with Symmetric Keys with Application to Private Data Processing Clouds, 2013.*
Rizzo, N., et al., Privacy Preserving Driving Style Recognition, Proc. of International Conference on Connected Vehicles and Expo (ICCVE), Oct. 19-23, 2015, pp. 232-237.
Garay, J., et al., "Practical and Secure Solutions for Integer Comparison", T. Okamoto and X. Wang, editors, Public Key Cryptography—PKC 2007, vol. 4450 of Lecture Notes in Computer Science, pp. 330-342. Springer Berlin, Heidelberg. 2007, 13 total pages.
Dowlin. N., et al., "CryptoNets: Applying Neural Networks to Encrypted Data with High Throughput and Accuracy", available at research.microsoft.com/apps/pubs/default.aspx?id., 10 pages, 2016.
Doröz, Y., et al, "Toward Practical Homomorphic Evaluation of Block Ciphers using Prince" XP061015781, Financial Cryptography and Data Security. FC 2014. Lecture Notes in Computer Science, vol. 8436. Springer, Berlin, Heidelberg. https://doi.org/10.1007/976-3-662-44774-1_17, Mar. 31, 2014, 12 pages.
Togan, M., et al., "Homomorphic Evaluation of Speck Cipher", The Publishing House of the Romanian Academy, Proceedings of the Romanian Academy, Series A, vol. 16, special issue, XP055659754, Jan. 1, 2015, pp. 375-384.
Lepoint, T., et al., "A Comparison of the Homomorphic Encryption Schemes FV and YASHE", Africacrypt 2014, LNCS 8469, XP055659758 Jan. 1, 2014, pp. 318-335.
U.S. Appl. No. 17/276,725, filed Sep. 16, 2019, Boudguiga, A., et al.
U.S. Appl. No. 16/467,851, filed Dec. 8, 2017, US 2019-0334708 A1, Stan, O., et al.

* cited by examiner

*Primary Examiner* — Minh Dinh
(74) *Attorney, Agent, or Firm* — Oblon, McClelland, Maier & Neustadt, L.L.P.

(57) ABSTRACT

The present invention concerns a method for confidentially processing the kinematic data of a vehicle, in particular a method for classifying this data in order to determine the driving style of the vehicle while respecting the confidentiality of the data in question. The data is encrypted by the vehicle by means of a symmetric encryption algorithm using a secret key generated by the vehicle. This secret key is encrypted by the vehicle by means of a homomorphic asymmetric encryption algorithm by using the public key of a vehicle service provider. The data encrypted by means of the secret key, and the homomorphically encrypted secret key, are transmitted by the vehicle to an access point that transcrypts them and transmits the homomorphically encrypted data to a calculation platform. The platform performs the confidential processing operation in the homomorphic domain and transmits the homomorphically encrypted results to the server of the vehicle service provider.

9 Claims, 3 Drawing Sheets

METHOD FOR CONFIDENTIALLY PROCESSING DATA OF A VEHICLE

TECHNICAL FIELD

The present invention relates to the general field of services to motorists. It applies especially to the characterisation of driving of a vehicle from its kinematic data. It is also concerned with the field of confidential processing of private data.

STATE OF PRIOR ART

Data generated by vehicles, and more particularly by on-board sensors, can be used to offer many services.

One of the most promising services is that of personalised insurance: from the list of kinematic data of a car, it is possible to characterise the type of driving of a motorist. A driver who subscribes to this type of service, known as "pay how you drive", will thus have the amount of his or her insurance premium modulated according to his or her driving style: a driver with a cautious driving profile will be able to pay a lower amount than a driver with a dangerous driving profile.

For example, the description of a method for characterising the driving type of a driver on the basis of kinematic data of his/her vehicle can be found in application US-A-2019/0023279.

Another service aimed at motorists is that of diagnosis, or even predictive maintenance. Based on the data collected on the vehicle, it is possible to detect the failure or state of wear of a part and to anticipate its replacement by automatically placing an order with the spare parts supplier or the equipment manufacturer. It is also possible to predict the frequency of maintenance operations based on the driver's driving profile.

In addition, equipment manufacturers can compile data from a fleet of vehicles and process them statistically in order to predict amounts to be produced.

Finally, data generated by the vehicles can be utilised to profile the drivers and offer them, via applications, services adapted to their different profiles.

It is clear, however, that these data are generally very sensitive and private. For example, they can be used to derive the driver's address, journeys, travel times, places of consumption, etc. Furthermore, the General Data Protection Regulation (GDPR) 2016/679 came into force in May 2018. This requires especially that technical measures are taken to ensure protection of personal data and restriction of access thereto according to the specific purpose of each processing. In particular, it is necessary to protect access to data that could reveal the behaviour or lifestyle of a given user.

A privacy preserving method for classifying the driving style of a vehicle has been described in the paper by N. Rizzo et al. entitled "Privacy preserving driving style recognition" published in Proc. of International Conference on Connected Vehicles and Expo (ICCVE), 19-23 Oct. 2015. However, the method provided needs to be executed by the vehicle itself, which is not always compatible with the on-board computational capacity in the vehicle. Further, it is not scalable in that each service provider has then to communicate individually with the vehicle to make it perform specific data processing. Finally, it lacks flexibility in that it does not easily allow for new data processing or joint processing of data from a plurality of vehicles.

The object of the present invention is to provide a method for confidentially processing data of a vehicle, in particular a classification of the type of driving of a vehicle based on its kinematic data, which respects confidentiality of these data while not having limitations of prior art.

DISCLOSURE OF THE INVENTION

The present invention is defined by a method for confidentially processing data of a vehicle, the kinematic data being transmitted by an on-board gateway of the vehicle to an access point of a network external to the latter and the processing result being transmitted to a server of a service provider (240), the provider having generated a private key-public key pair of a homomorphic encryption asymmetric cryptosystem, said method being specific in that:

the vehicle generates a secret key of a symmetric encryption cryptosystem and encrypts said secret key by means of the homomorphic encryption public key;
the vehicle encrypts said data by means of the symmetric encryption secret key;
the vehicle transmits the homomorphically encrypted secret key as well as the data thus encrypted to the access point, said access point performing a second encryption of the data thus encrypted, by means of the homomorphic encryption public key, in order to obtain doubly encrypted data, and then, by means of the homomorphically encrypted secret key, a decryption in the homomorphic domain of the doubly encrypted data, in order to obtain homomorphically encrypted data, and transmitting them to a computing platform;
the computing platform performs, in the homomorphic domain, processing of the data received from the access point and transmits the processing result, in homomorphically encrypted form, to the server of the service provider.

The confidential processing may especially be a classification of said data, the processing result giving one of a plurality of predetermined classes to which said data belong or the respective probabilities that said data belong to those predetermined classes.

The classification is, for example, a hyperplane classification, each hyperplane being defined by an affine function in the cleartext domain.

Said data typically comprise kinematic data of the vehicle. The predetermined classes may be driving dangerousness classes of the vehicle.

According to one alternative, the classification is obtained by a classification function comprising, as an argument, the kinematic data of a plurality of vehicles.

Advantageously, the symmetric encryption is a key stream encryption.

The symmetric encryption of said data by the secret key is preferably performed by means of the on-board gateway.

The on-board gateway may be configured to establish a Wi-Fi connection, or according to 3G/4G/5G telephone standard with the access point.

BRIEF DESCRIPTION OF THE FIGURES

Further characteristics and advantages of the invention will become apparent upon reading a preferential embodiment of the invention, described with reference to the accompanying figures, among which.

DESCRIPTION OF THE EMBODIMENTS

In the following, a vehicle equipped with on-board sensors and able to connect to a vehicular network via a gateway will be considered.

On-board sensors are typically sensors of vehicle position (GPS receiver, for example), speed and acceleration along different axes, vehicle wheel rotation speed, etc., capable of measuring kinematic parameters of the vehicle. Furthermore, other types of on-board sensors can also be provided, such as sensors for instantaneous vehicle consumption, gear shift, brake temperature etc. The measurements of these sensors are digitised and, if necessary, pre-processed (for example by means of data compression) within the vehicle.

The various sensors are connected to an inner network of the vehicle. This inner network can communicate with an external communication infrastructure by means of an on-board gateway. The gateway in question may, for example, use Wi-Fi technology (IEEE 80211) or versions adapted to vehicular communications, such as IEEE 802.11p (in the United States) and ETSI ITS-G5 (in Europe), provided for future Cooperative Intelligent Transport Systems or C-ITS. Alternatively, it may use a 3G/4G/5G mobile phone standard. If necessary, if the vehicle is not equipped with a Wi-Fi or mobile phone gateway, a dongle including a Wi-Fi transceiver or in accordance with one of the above standards can be plugged into an ODB2 (On Board Diagnostic) socket of the vehicle.

The data from various sensors of the vehicle can be transmitted to the external communication infrastructure as they are generated or stored in a temporary memory in the vehicle and then transferred massively or even in increments. These data are then processed confidentially by a remote server as will be seen later.

Figure 1:
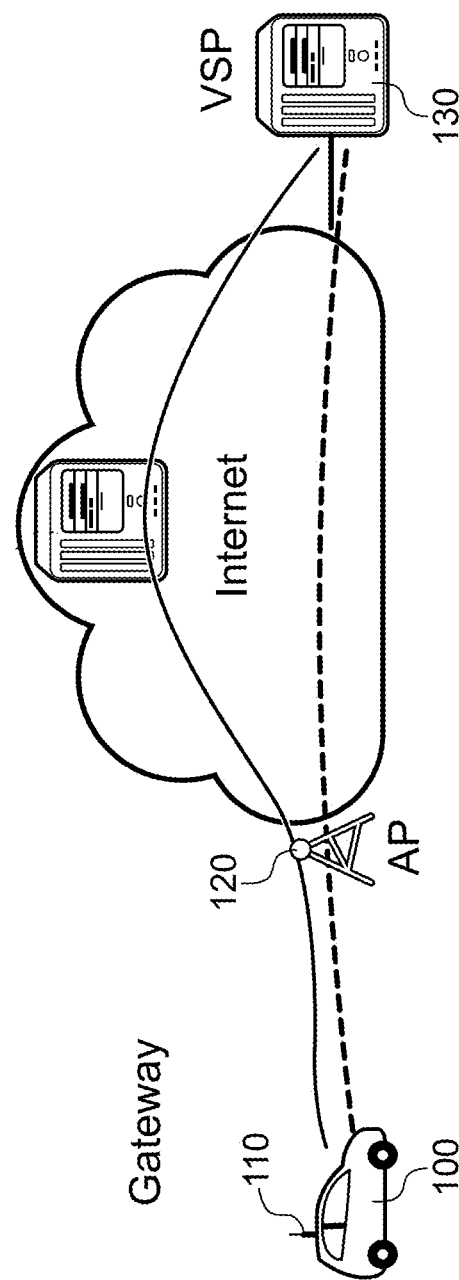
FIG. 1 schematically represents the architecture of a network in which the method for confidentially processing data of a vehicle according to one embodiment of the invention can be implemented.

FIG. 1 schematically represents a network architecture in which a method for confidentially processing vehicle parameters can be implemented.

The gateway 110, on-board the vehicle 100, can establish a link with an access point AP, 120, whether it is a Wi-Fi terminal or a base station (BTS, node B, etc.) of a mobile phone network.

In current systems, data from a vehicle are transmitted directly to a Vehicle Service Provider (VSP) server, 130, as indicated by a dashed line in the figure. The service provider thus receives the cleartext data and can perform statistics, classify driving types, perform diagnostics, make predictions, determine a driver's responsibility in the event of an accident, etc. For example, the service provider may be an insurer using these data to determine the insurance premium depending on the driving type of the vehicle. However, these data are particularly sensitive and can be intercepted by a malicious third party.

A first solution is to encrypt data before transmitting them to the service provider. However, this measure is not entirely satisfactory as the driver may not wish to communicate confidential data to the service provider.

According to the present invention, it is suggested to introduce a computing platform (cloud computing), 150, which is responsible for performing the data processing confidentially on behalf of the server VSP and providing the VSP with only the result of this processing.

More specifically, the vehicle encrypts data by means of symmetric encryption, preferably stream encryption, using a secret key $K_{sym}^{car}$. It further encrypts this secret key by homomorphic encryption, by means of the public key HE.p-$k_{pub}^{vsp}$, of a homomorphic encryption asymmetric cryptosystem whose private key—public key pair (HE.sk$^{vsp}$, HE.p-k$^{vsp}$), is specific to the VSP. The access point then performs a trans-encryption of the data by decoding them in the homomorphic domain and transmits them to the computing platform. The computing platform then performs the corresponding processing of these data in the homomorphic domain before transmitting them to the server VSP.

Figure 2:
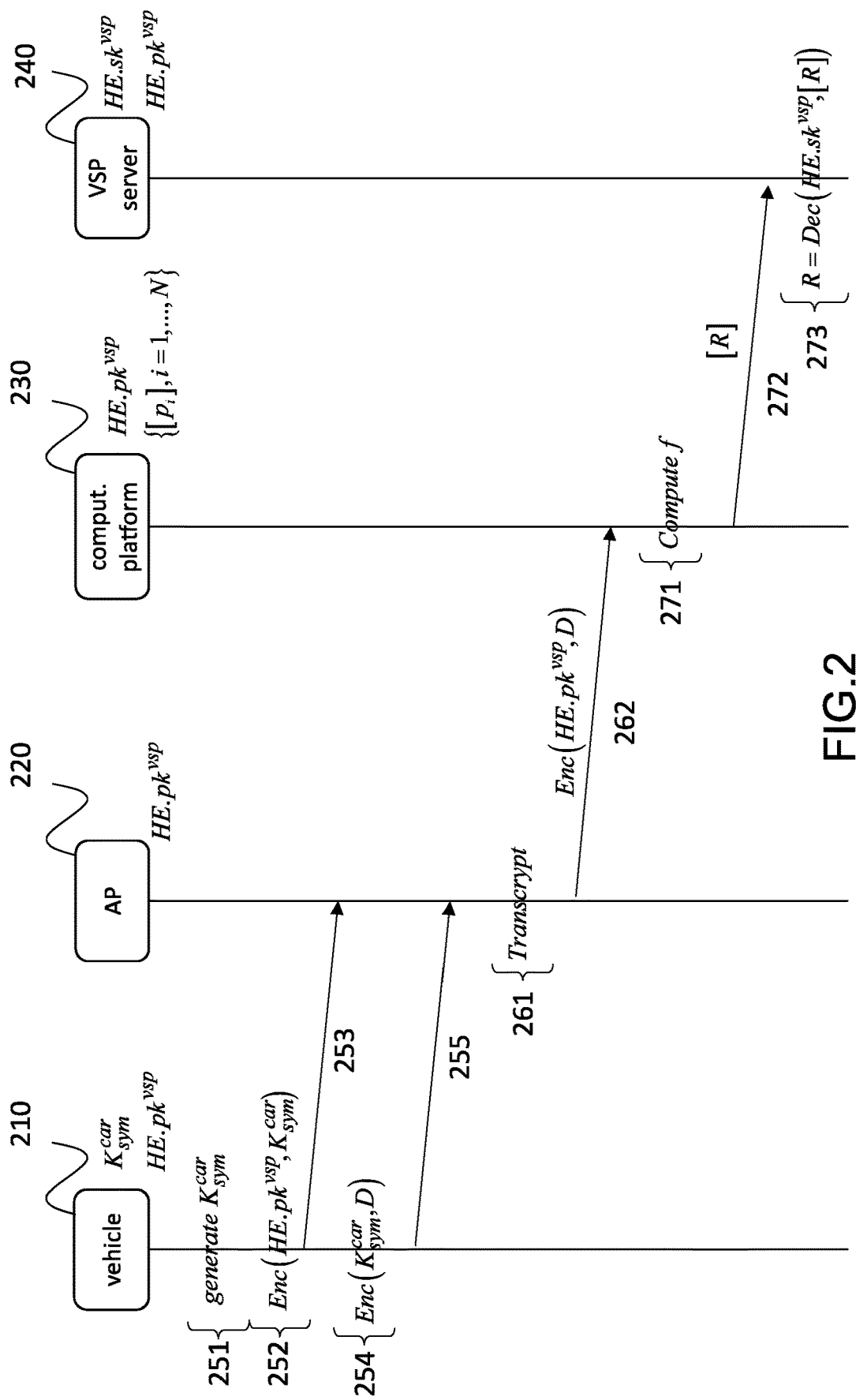
FIG. 2 schematically represents exchanges between entities of the network of FIG. 1 upon implementing a method for confidentially processing the data of a vehicle according to one embodiment of the invention.

FIG. 2 schematically represents exchanges between entities of the network of FIG. 1 when a method for confidentially processing data of a vehicle is implemented according to one embodiment of the invention.

It is first assumed that the vehicle service provider, 240, has previously generated a private key—public key pair (HE.sk$^{vsp}$, HE.pk$^{vsp}$) of an asymmetric homomorphic cryptosystem and has broadcast the public key to the vehicle 210, the access point 220 and the computing platform, 230.

The vehicle generates in 251 a secret key $K_{car}^{sym}$ of a symmetric encryption cryptosystem. Advantageously, this symmetric encryption is a stream encryption, in other words a key stream generated by means of the symmetric key is added by means of an XOR operation to the cleartext binary data. The vehicle encrypts the secret key by means of the public key of the homomorphic cryptosystem in 252, and transmits the key thus encrypted Enc(HE.pk$^{vsp}$, $K_{sym}^{car}$) to the access point in 253. Furthermore, the vehicle performs a first encryption of the data, D, in 254 by means of this same secret key, namely Enc($K_{sym}^{car}$, D), and transmits them thus encrypted to the access point in 255.

In step 261, the access point performs a trans-encryption of the data in the homomorphic domain. In other words, the access point first encrypts the already encrypted data, Enc($K_{sym}^{car}$, D) a second time by means of the public key of the homomorphic cryptosystem, to obtain doubly encrypted data Enc(HE.pk$^{vsp}$, Enc($K_{sym}^{car}$, D)). It then performs decryption of the doubly encrypted data in the homomorphic domain, by means of the homomorphically encrypted secret key Enc($K_{sym}^{car}$, D)). A description of this trans-encryption operation can be found in the patent application published under number FR-A-3060165 in the name of the present Applicant. Following the trans-encryption operation, the access point has the data of a vehicle encrypted in the homomorphic domain, Enc(HE.pk$^{vsp}$, D), and transmits them, in 262, to the computing platform. It is important to note that the trans-encryption operation is carried out by the access point and not by the computing platform itself. This delegation of trans-encryption makes it possible, among other things, not to overload the computing platform. The platform only needs to know the public keys of the homomorphic cryptosystems of the different vehicle service provider servers, which are far fewer in number than the number of (symmetric keys of) the vehicles.

In step 271, the computing platform performs data processing in the homomorphic domain. Specifically, the computing platform performs a classification operation on data in the homomorphic domain using a classification model, as described in detail below. The classification model may have been obtained in a supervised manner using a learning database or it may have been constructed in an unsupervised manner (especially by means of simple clustering).

For example, the classification model will be able to evaluate the driving style of the vehicle and its membership of different dangerousness classes $C_1, C_2, \ldots, C_K$. The result of the classification can be provided to the server VSP in the form of a vector, known as a membership vector, of K homomorphically encrypted components, each of which represents the membership of a class (binary value) or the probability of membership of that class (for example dyadic fraction).

The membership vector is transmitted to the server VSP in 272. The latter decrypts the components by means of its private key HE.sk$^{vsp}$ in 273.

The person skilled in the art will understand that the method for processing data of a vehicle can be readily updated. Since the processing is carried out by the computing platform, it is sufficient to modify the corresponding processing function in the homomorphic domain in this server. In particular, it is not necessary to update software in all vehicles that subscribe to the service. Further, the processing function (for example the classification function) can take account of the data of several vehicles, as long as they are encrypted with the same homomorphic public key HE.pk$^{vsp}$. This is advantageous when comparing the behaviour of two vehicles at the same location (for example in the context of an accident) or when the classification model is trained in an unsupervised manner. Finally, it should be noted that the server VSP does not have direct access to the kinematic data of the vehicle, which are confidential in nature, but only to the processing result, for example the result of the classification of the vehicle driving, by means of a classification function $f$.

The classification function $f$ is evaluated in the homomorphic domain as follows:

$$[R] = f([D], \{[p_i], i = 1, \ldots, N\}) \qquad (1)$$

where for the sake of brevity [x]=Enc=(He.pk, x) is the classification result (for example the membership vector) and $P_i$, i=1, ..., N are the parameters (in cleartext) of the classification function. It is assumed that the set of homomorphically encrypted parameters has been provided to the computing platform beforehand.

This evaluation is possible in the homomorphic domain as long as the function $f$ is a linear or polynomial function, of the data to be classified.

As an example of a polynomial (quadratic) classification, a Gaussian classifier can be mentioned.

As an example of a linear function, a hyperplane classifier can be mentioned.

The case of a hyperplane classifier is illustrated below for a 2-dimension space. The data D are then 2-dimension vectors (for example acceleration along two axes), D=(x, y).

For example, a class can be defined by the intersection of 2 half-spaces delimited by hyperplanes, expressed in the cleartext domain by:

$$a_1 x + b_1 y \geq c_1 \qquad (2)$$
$$a_2 x + b_2 y \geq c_2$$

where $a_1$, $b_1$, $c_1$, $a_2$, $b_2$, $c_2$ are the parameters of the classification function in the cleartext domain.

The classification function in the homomorphic domain is based on computing the result $[R]=([r_1], [r_2])$, defined by:

$$[r_1] = [a_1][x] + [b_1][y] - [c_1] \qquad (3)$$
$$[r_2] = [a_2][x] + [b_2][y] - [c_2]$$

where all algebraic operations are defined here in the homomorphic domain.

The position of the piece of data D with respect to the two hyperplanes makes it possible to determine the class to which it belongs. Thus, for example, if $[r_1] \geq 0$, and $[r_2] \geq 0$, the piece of data D will belong to a first class $C_1$ and, conversely, if $[r_1] \leq 0$ or $[r_2] \leq 0$, the piece of data will belong to a second class $C_2$. The comparison of results in the homomorphic domain can be performed by means of Boolean circuits for the operator ">" (greater than) on binary representations of encrypted data, as described in the paper by J. Garay et al. entitled "Practical and secure solutions for integer comparison" published in T. Okamoto and X. Wang, editors, Public Key Cryptography—PKC 2007, volume 4450 of Lecture Notes in Computer Science, pages 330-342. Springer Berlin, Heidelberg, 2007.

Alternatively, it is possible to use a non-linear and non-polynomial classification function (for example neural network classification) especially when such a function can be approximated locally by a polynomial function (for example Taylor series). An example of secure neural network classification can be found in the paper by N. Dowlin et al. entitled "CryptoNets: applying neural networks to encrypted data with high throughput and accuracy", available at research.microsoft.com/apps/pubs/default.aspx?id.

The method for confidentially processing data of a vehicle has been described in connection with a single vehicle, an access point, a computing platform and a vehicle service provider server. However, in practice the method involves a large number of vehicles and access points as well as several computing platforms and servers VSP. This situation is schematically illustrated in FIG. 3.

Figure 3:
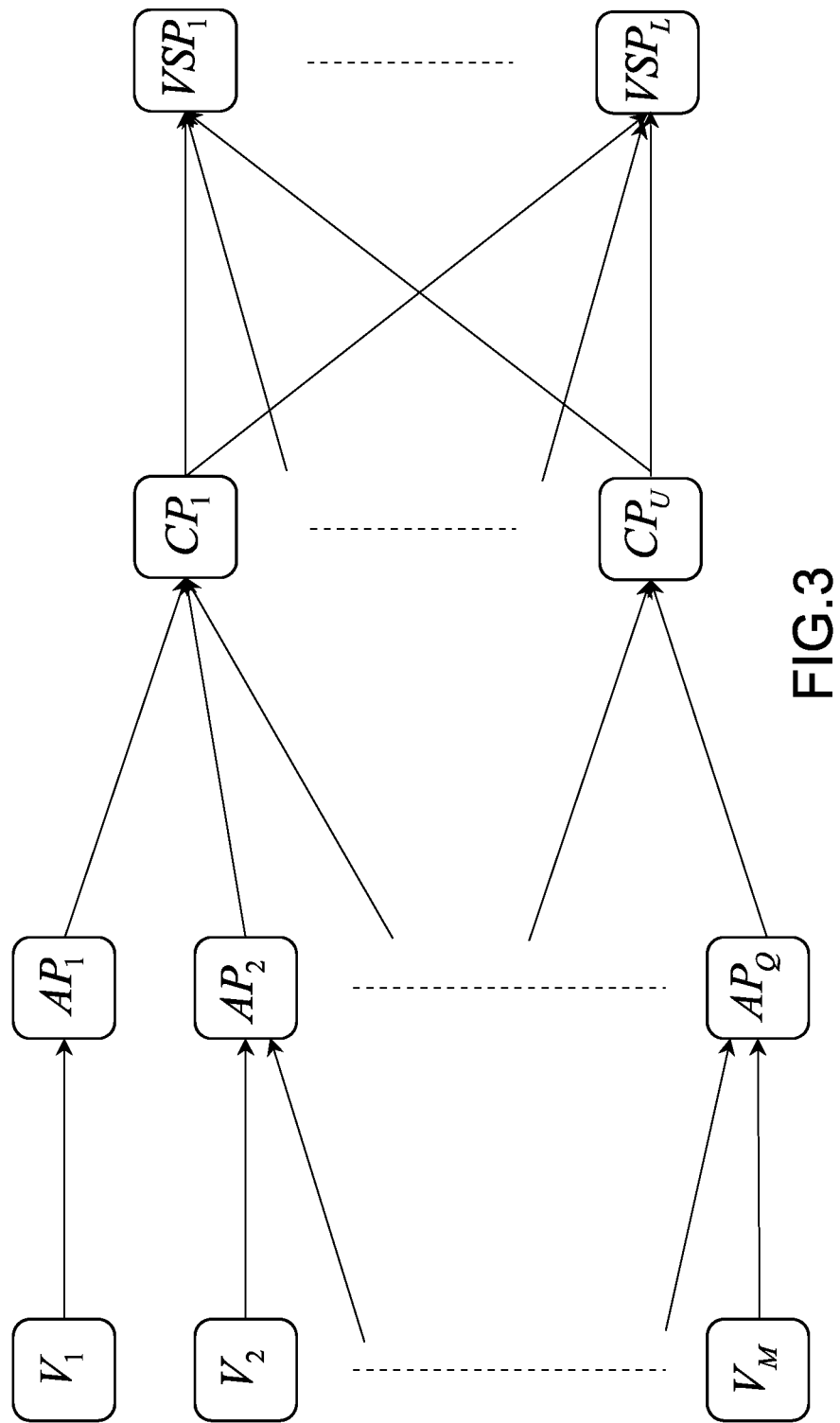
FIG. 3 schematically represents an alternative of exchanges between network entities upon implementing a method for confidentially processing data of a vehicle according to one embodiment of the invention.

A plurality of vehicles $V_1, \ldots, V_M$, a plurality of access points $AP_1, \ldots, AP_Q$, a plurality of computing platforms $CP_1, \ldots, CP_U$, as well as a plurality of vehicle service provider servers $VSP_1, \ldots, VSP_L$, are represented in FIG. 3.

As a general rule, a computing platform can be shared by several service providers, in other words L<U. The homomorphic public keys of the service providers are broadcast to the computing platforms that can perform processing on behalf of these providers. In other words, a computing platform $CP_u$ stores all the homomorphic public keys HE.pk$_l$ of the servers VSP$_l$ likely to send it processing requests. Alternatively, this set of homomorphic public keys can be stored in a key base, whether distributed or not. In this case, the computing platform that does not have a key HE.pk$_l$ can download it from the key base in question by means of its reference.

An access point can store the different homomorphic public keys of the service providers, each vehicle then transmitting the reference of the homomorphic public key used, by means of a simple auxiliary indication if necessary. Alternatively the homomorphic public key can be provided to the access point by the vehicle itself. For example, if the access point does not have the homomorphic public key corresponding to this reference, it can be obtained from the vehicle.

A vehicle has, as a general rule, the homomorphic public keys of the service providers to which it subscribes, for example that of its insurance, the vehicle hire agency's insurance, the vehicle manufacturer, the vehicle maintenance company. As indicated previously, the vehicle can transmit, further to the data encrypted by the key, and the homomorphically encrypted symmetric key, the reference of the homomorphic public key it used to encrypt the symmetric key. This reference is then transmitted with the encrypted data to the computing platform, which can then find the homomorphic public key in question or even download it from the key base.

The invention claimed is:

1. A method for confidentially processing data of a vehicle, the data being transmitted by an on-board gateway of the vehicle to an access point of a network external to the network and a processing result being transmitted to a server of a service provider, the service provider having generated a private key-public key pair of a homomorphic encryption asymmetric cryptosystem, the method comprising:

the vehicle generating a secret key of a symmetric encryption cryptosystem and encrypting said secret key by means of the homomorphic encryption public key;

the vehicle encrypting said data by means of the symmetric encryption secret key;

the vehicle transmitting the homomorphically encrypted secret key as well as the data thus encrypted to the access point, said access point performing a second encryption of the data thus encrypted, by means of the homomorphic encryption public key, to obtain doubly encrypted data and then, by means of the homomorphically encrypted secret key, a decryption of the doubly encrypted data in the homomorphic domain, to obtain homomorphically encrypted data, and transmitting the homomorphically encrypted data to a computing platform; and the computing platform performing, in the homomorphic domain, the confidential processing of the data received from the access point and transmitting the processing result, in homomorphically encrypted form, to the server of the service provider.

2. The method for confidentially processing the data of the vehicle according to claim 1, wherein the confidential processing is a classification of said data, the processing result giving one of a plurality of predetermined classes to which said data belong, or the respective probabilities that said data belong to those predetermined classes.

3. The method for confidentially processing the data of the vehicle according to claim 2, wherein the classification is a hyperplane classification, each hyperplane being defined by an affine function in the cleartext domain.

4. The method for confidentially processing the data of the vehicle according to claim 2, wherein said data comprises kinematic data of the vehicle.

5. The method for confidentially processing the data of the vehicle according to claim 4, wherein the predetermined classes are driving dangerousness classes of the vehicle.

6. The method for confidentially processing the data of the vehicle according to claim 4, wherein the classification is obtained by a classification function comprising, as an argument, the kinematic data of a plurality of vehicles.

7. The method for confidentially processing the data of the vehicle according to claim 1, wherein the symmetric encryption is a key stream encryption.

8. The method for confidentially processing the data of the vehicle according to claim 1, wherein the symmetric encryption by the secret key of said data is performed by means of the on-board gateway.

9. The method for confidentially processing the data of the vehicle according to claim 1, wherein the on-board gateway is configured to establish a Wi-Fi connection, or according to a 3G/4G/5G telephone standard, with the access point.

* * * * *